United States Patent [19]

Voigtländer et al.

[11] 4,308,760
[45] Jan. 5, 1982

[54] HEAVY LOAD CAPABILITY GEAR WHEEL

[75] Inventors: Otto Voigtländer, Remscheid; Walter Mages, Radevormwald, both of Fed. Rep. of Germany

[73] Assignee: Thyssen Industrie AG, Fed. Rep. of Germany

[21] Appl. No.: 131,050

[22] Filed: Mar. 17, 1980

[30] Foreign Application Priority Data

Mar. 21, 1979 [DE] Fed. Rep. of Germany ....... 2910981

[51] Int. Cl.³ .............................................. F16H 55/17
[52] U.S. Cl. .................................. 74/459.5; 29/159.2; 74/462
[58] Field of Search ...................... 74/462, 459.5, 457, 74/460; 29/159.2

[56] References Cited

U.S. PATENT DOCUMENTS

| 2,778,240 | 1/1957 | Prester | 74/459.5 |
| 3,104,557 | 9/1963 | Baxter, Jr. | 74/459.5 |
| 3,180,172 | 4/1965 | Leggatt | 74/462 |
| 3,605,518 | 9/1971 | Haller | 74/459.5 |

FOREIGN PATENT DOCUMENTS 317280 12/1919 Fed. Rep. of Germany .
2053789 5/1971 Fed. Rep. of Germany .

*Primary Examiner*—C. J. Husar
*Assistant Examiner*—Conrad Berman
*Attorney, Agent, or Firm*—McGlew and Tuttle

[57] ABSTRACT

A gear is disclosed with a heavy loading capacity which has teeth roots between adjacent gear teeth and contact area patterns on the face of each gear tooth. Each tooth root includes a concave fillet running substantially in a direction of the rolling element generator line of the gear. The top of each tooth is substantially equidistant and a mirror image of the tooth root fillet.

11 Claims, 6 Drawing Figures

HEAVY LOAD CAPABILITY GEAR WHEEL

BACKGROUND OF THE INVENTION

The invention concerns a gear wheel or gear segment having a heavy load capability where the tooth root between two adjacent teeth takes the form, in the longitudinal direction, of a concave fillet running approximately in the direction of the rolling element generator line or of a tangent to the rolling element, and the tooth top in the longitudinal tooth direction, has a shape equidistant to the tooth root of the mating wheel in its operating position.

The general trend toward lightweight construction has also led, in gear wheel and transmission production, to constantly decreasing power weight ratios of the transmissions, i.e. to maximum possible power transmission with minimum overall height. A significant example of this is to be found in the differential gear units in vehicle rear axles. The tooth surface load capability is of secondary importance for these differential gear units. The determining feature for overall height is to be found solely in the dedendum load capability. The saving in weight is of considerable importance for these transmission units as they belong to the unsprung masses of a vehicle.

To reduce the power weight ratio two methods have been used until now, on the one hand, optimization of the fillet and on the other hand, taking advantage of the possibilities of materials such as, for example, case hardening, etc. These possibilities have, to a large extent, been exhausted and a limit has been reached which can no longer be exceeded with the technical means presently available.

An attempt has already been made to increase dedendum load capability by making the tooth roots concave and the apex of the teeth convex in the direction of the tooth face width (German Pat. No. 317 280). The increase in load capability with this gear wheel, however, is unsatisfactory as is described in detail below. The same applies to the bevel gear known from German Offenlegungsschrift No. 2 053 789 where the tooth spaces are provided with lateral reinforcement sections which extend at right angles to the tooth spaces and connect adjacent teeth to one another.

SUMMARY OF THE INVENTION

The purpose of this invention is to reduce the disadvantages of conventional gear wheels with regard to power and weight, and to provide a gear wheel which has a considerably higher load capability than the known conventional gear wheel forms.

This problem is solved, in the case of a gear wheel of the species mentioned above, by the shape of the tooth root which takes the form of an approximate equidistant to the contact pattern on the tooth surface obtained during rotation of the gear wheel. By virtue of the resultant approach of the boundary of the active tooth surface profile to the contact pattern, the distances of the force application points from supporting wheel base are reduced to a ideal degree, as a result of which low bending moments with only minor elastic deformation take place. This low elastic flexibility improves the running properties and also keeps the dynamic loading low in case of shocks. Noise is reduced and by virtue of the high degree of rigidity of the gear wheel covered by the invention, the occurrence of additional dynamic forces is prevented and the gear wheel possessing high load capability combined with low weight. In the case of the gear wheel in accordance with German Pat. No. 3 17 280, no account has been taken of how load distribution takes place on the tooth surface as a result of the contact pattern.

Particularly with the flat recesses in the tooth root easily produced during machining of the convention gear wheel, the load capability is increased only insignificantly by partially wide clearance between the tooth root and the load supporting areas of the tooth surfaces. The same applies to gear wheels in accordance with German Offenlegungsschrift No. 2 053 789 where also no account has been taken of the contact pattern and only flat reinforcements have been provided.

In greater detail, the invention can take the following form.

A simply produced form of the fillet in the tooth root is the segment of arc form. This form is particularly easy to produce on tooth tops as well.

It is also possible to form the shape of the fillet in the tooth root with two or more straight lines meeting at an obtuse angle to one another, it being possible by this means to obtain particularly high load capability.

One design with particularly favourable rolling contact characteristics takes the form of the fillet in the tooth root being designed as a segment of an elipse.

One is not, of course, restricted when mounting a pair of gears to tooth top and tooth root of a gear wheel having identical forms, that is to say, for example, arcs of circle having concave and convex curvature, but it is also possible to select different forms of tooth top and tooth root for each gear wheel. Matching is only necessary in each case to the mating wheel. In addition, it can be assumed, quite generally, that the tooth top can be of any desired form, but such that contact with the tooth root of the mating wheel is positively prevented.

A bevel gear wheel should preferably be designed so that the concave fillet of the tooth root runs approximately in the direction of the rolling cone generatrix or of another tangent to the rolling cone.

A particularly desirable form of the bevel gear is obtained by the concave fillet of the tooth root being located between an approximately tubular section parallel to the gear wheel axis and an adjacent approximately flange-shaped section of the gear wheel forming an angle therewith and running approximately in the direction of the rolling cone generatrix or another tangent to the rolling cone.

The characteristics of pairs of gears can be increased still further by the tooth surfaces additionally being given conventionally produced vertical and/or lateral convexity in such a way that the area of contact between two teeth in engagement forms a contact pattern which constitutes an almost eliptic area. This only or predominantly prevents the edges from supporting the load when the teeth make rolling contact. In addition, maintaining an equidistant to the contact pattern for the shape of tooth root and tooth top is facilitated by selection of the relatively simple eliptic form.

By virtue of the fact that the form of the fillet in the tooth root describes an angle of 45° or over with the rolling element surface along the lateral boundary and is produced laterally into the area of the rolling element generator line, a particularly favourable supporting effect is achieved with narrow construction because it is possible to follow the contact pattern particularly closely.

By virtue of the fact that the angle is 90°, a closed area results for the tooth top and tooth root which blends smoothly into one another. Equidistance from the contact pattern can be achieved with particularly narrow design and optimum load capability.

The invention is not, or course, restricted to gear wheels, but can also be applied to all transmission elements of gear wheel form where transmission of high power ratings is involved. It has been found that modification of the tooth top also has the additional advantage that smoother engagement and thus quieter running of the teeth is obtained. Instead of shock like engagement over the entire tooth face width, tooth contact takes place initially in point form and only extends over the entire tooth face width with progressive engagement. Thus, it is no longer necessary to apply special measures to improve running properties, such as, for example, tooth top and dedendum reduction which means considerable simplification in manufacture. The gear wheel in accordance with the invention can easily be produced by the conventional gear wheel manufacturing methods. Forging or stamping are particularly suitable.

It is noted that in each case, the direction in which the tooth root extends is a tangent to the rolling element generator line since the generator line itself can be considered to be a tangent.

Accordingly, an object of the invention is to provide a gear with heavy load capacity having a tooth root between two adjacent gear teeth and a contact pattern on each gear tooth comprising, each tooth formed by a concave fillet running substantially in the direction of a rolling element generator line tangent, a tooth top of each tooth having a form which is equidistant from a root of a mating gear, the fillet form of each tooth root being equidistant from the contact pattern of the two adjacent gear teeth.

Another object of the present invention is to provide a gear with heavy load capacity which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
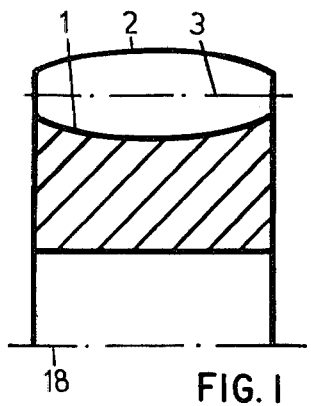
FIG. 1 is a partial sectional view of a gear wheel in accordance with the invention taken between adjacent gear teeth and through a tooth root showing the dedendum design.

Turning to the drawings in particular, the invention embodied therein in FIG. 1 comprises a gear formation which may either be a gear wheel or a gear segment having a particular dedendum design and tooth top form.

According to FIG. 1, the tooth root 1 of the gear is formed by a concave fillet which is bounded by an arc. The tooth top 2 has a shape which is a mirror image of tooth root 1 and formed by an arc. The fillet forming the tooth root 1 lies in the direction of the pitch cylinder generator line 3 of the gear wheel.

Figure 2:
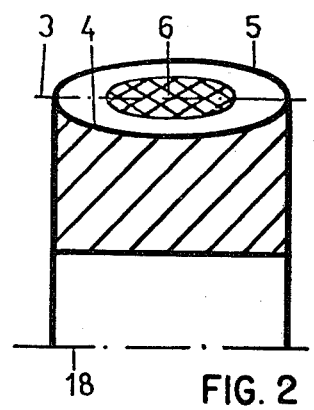
FIG. 2 is a view similar to FIG. 1 which shows an alternate form of the invention and also shows the contact pattern of the inventive gear.

According to FIG. 2, the tooth root 4 forms an elipse with the tooth top 5 which is almost equidistant from the contact pattern 6 of the gear wheel.

Figure 3:
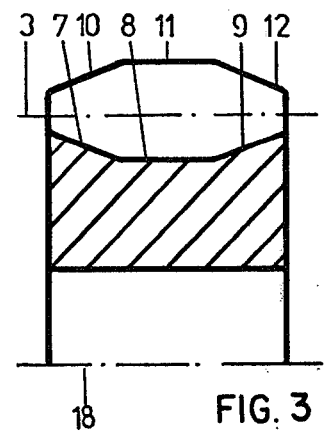
FIG. 3 is a view similar to FIG. 1 of an alternate embodiment of the invention.

According to FIG. 3 the tooth root 7, 8, 9 is formed by three straight lines, two of which in each case meet at an obtuse angle. The tooth top 10, 11, 12 is correspondingly a mirror image, but can take any other form corresponding to the tooth root of a mating wheel (not shown). As these are straight toothed gear wheels, the fillets of all three designs forming the tooth root are approximately parallel to the pitch cylinder generator line 3. In the case of helical or spiral tooth gear wheels, the fillets forming the tooth root extend in the direction of a tangent to the pitch cylinder, the location of the tangent corresponding approximately to the spiral angle of the gear wheel.

Figure 4:
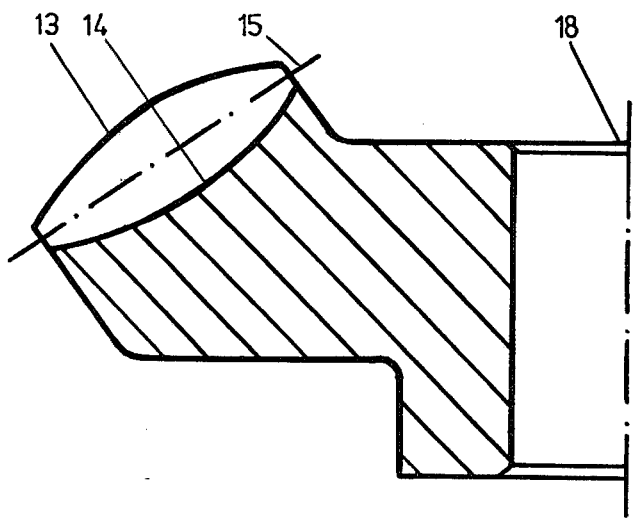
FIG. 4 is a view similar to FIG. 1 of a bevel gear design in accordance with the invention.

FIG. 4 shows a section through the tooth space of a bevel gear in accordance with the invention showing the design of the tooth top 13 and dedendum 14. In fillet forming the tooth root 14 extends approximately in the direction of the rolling cone generatrix 15 of the bevel gear. With helical or spiral tooth bevel gears, the same will apply as regards the location of the fillet forming the tooth root as was stated for cylindrical gear wheels that is the root 14 will extend parallel to a tangent to the cone generatrix.

Figure 5:
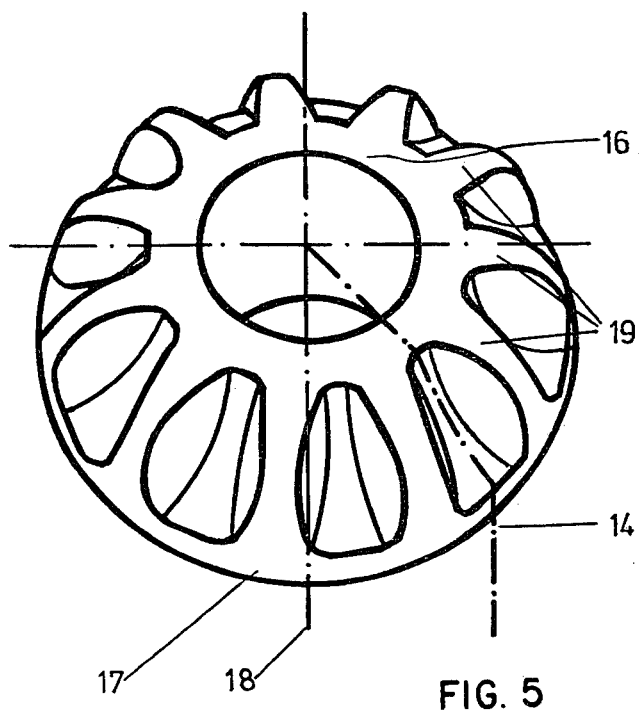
FIG. 5 is a perspective view of a bevel gear design in accordance with the invention.
Figure 6:
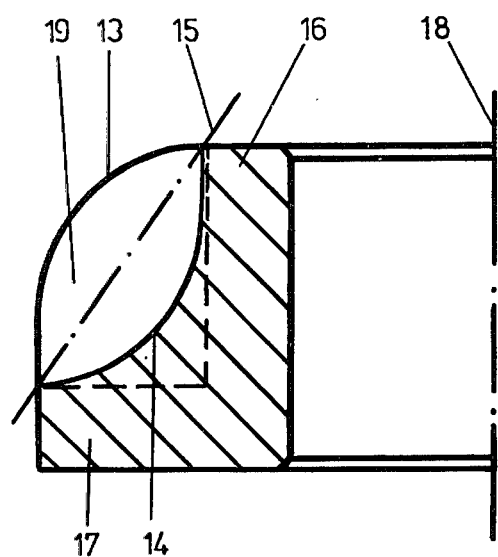
FIG. 6 is a view similar to FIG. 1 of the embodiment of the invention shown in FIG. 5.

FIGS. 5 and 6 show a bevel gear consisting of an approximately tubular section 16 and a flange-type section 17 adjacent to it forming an angle with the tubular section. The tubular section 16 is parallel to the gear wheel axis 18. Between the tubular section 16 and the flange-type section 17 are located the teeth 19 whose tooth root 14 is bounded by a concave fillet whose shape is in accordance with the invention. The tooth top 13 is a mirror image of tooth root 14. The fillet lies approximately in the direction of the rolling cone generatrix 15.

While specific embodiments of the invention have been known and described in detail to illustrate the application of the principles of the invention, it will be understood that the invention may be embodied otherwise without departing from such principles.

We claim:

1. A gear with heavy load capacity having a tooth root between two adjacent gear teeth and a contact pattern on each gear tooth comprising, each tooth root forming a concave fillet running substantially in the direction of a rolling element generator line tangent, a tooth top of each tooth having a form which is equidistant from a tooth root of a mating gear, the fillet form of the tooth root between two adjacent gear teeth being equidistant from the contact pattern of the two adjacent gear teeth.

2. A gear according to claim 1, wherein the fillet form of the tooth root is in the shape of an arc segment.

3. A gear according to claim 1, wherein the fillet form of the tooth root is made up of at least two straight lines meeting at at least one obtuse angle.

4. A gear according to claim 1, wherein the fillet form of the tooth root is in the shape of a segment of an ellipse.

5. A gear according to claim 1, wherein each gear tooth has a surface which includes at least one of a vertical and lateral convexity whereby the contact area of each gear tooth form elliptic areas.

6. A gear according to claim 1, wherein each fillet of each tooth root describes an angle of at least 45° with the rolling element generator line and projects laterally into an area of the rolling element generator line.

7. A gear according to claim 6, wherein the angle is approximately 90°.

8. A gear according to claim 1, comprising a bevel gear the concave fillet thereof running substantially in the direction of a rolling cone generatrix tangent of the bevel gear.

9. A gear according to claim 8, wherein the fillet runs substantially in the direction of the rolling cone generatrix.

10. A gear according to claim 8, including a tubular section having an axis parallel to an axis of the gear, a flange section extending radially outwardly of the tubular section, the rolling cone generatrix extending from an edge of the flange section to an edge of the tubular section.

11. A bevel gear wheel having heavy load capability comprising a tubular section having an axis parallel to an axis of the bevel gear wheel, a flange section extending radially outwardly of the tubular section, a rolling cone generatrix of the bevel gear extending from an edge of the flange section to an edge of the tubular section, a tooth root between each two adjacent gear teeth having the form of a concave fillet extending substantially in the direction of the rolling cone generatrix, each gear tooth having a top formed in a mirror image shape to the tooth root about the rolling cone generatrix, each point of the tooth root being equidistant from a contact pattern on a surface of each of said adjacent gear teeth.

* * * * *